United States Patent [19]
McClendon

[11] 3,846,405
[45] *Nov. 5, 1974

[54] CATIONIC FLOURS AND STARCHES

[75] Inventor: Jack C. McClendon, Lake Jackson, Tex.

[73] Assignee: The Dow Chemical Company, Midland, Mich.

[ * ] Notice: The portion of the term of this patent subsequent to Apr. 3, 1990, has been disclaimed.

[22] Filed: Sept. 5, 1972

[21] Appl. No.: 286,846

[52] U.S. Cl............ 260/233.3 R, 106/150, 162/175, 260/17.3
[51] Int. Cl............................................ C08b 19/06
[58] Field of Search.......... 260/233.3 A, 233.5, 17.3; 106/150

[56] References Cited
UNITED STATES PATENTS
3,725,387    4/1973    McClendon.................. 260/233.3 R

*Primary Examiner*—Melvyn I. Marquis
*Attorney, Agent, or Firm*—L. Wayne White

[57] ABSTRACT

Cationic farinaceous materials, useful as flocculants and paper additives, are prepared by: (A) contacting gaseous ethylenimine with a farinaceous material(s), the temperature of the farinaceous material being below the dew point of the ethylenimine vapors; (B) warming the mixture from step (A) to a temperature sufficient to cause ethylenimine to react with the farinaceous material; and (C) acidifying the product from step (B) with, for example, anhydrous HCl.

9 Claims, No Drawings

CATIONIC FLOURS AND STARCHES

BACKGROUND OF THE INVENTION

Cationic starches and flours have been prepared by reacting ethylenimine (aziridine) with various starches and flours. The aminoethylated products thus formed are flocculants and paper additives. In the latter instance they serve primarily as pigment retention aids and, in some instances, they additionally improve the wet and/or dry strength of the paper.

The reaction of ethylenimine, hereafter EI, with starch and flour has been conducted in a slurry process wherein the reactants are blended in the presence of solvents or diluents and also in a "direct" process, sometimes referred to as a "dry" or "semi-dry" process. In the latter instance, EI was generally blended with starch or flour preheated to a temperature sufficient to cause EI to react with the starch or flour (e.g. 90°–100°C).

The dry and semi-dry type of reaction has several advantages over the slurry process. For instance, the steps of drying the product and recovering the solvent are deleted and the product is not contaminated with residual solvent.

A unique process for making cationic starches and flours via a dry-type reaction was described in U.S. patent application Ser. No. 136,219 filed by J. C. McClendon and E. L. Berry on Apr. 21, 1971 now Pat. No. 3,725,387. The application is entitled "Aminoethylation of Flour and Starch with Ethylenimine." It is commonly owned and its disclosure is incorporated herein by reference. The novel products there described are the starting materials used in the instant invention. They are prepared by:

A. contacting
   1. ethylenimine in the vapor phase at a temperature of at least about 40°C., with
   2. a granular farinaceous material(s), the temperature of which is below the dew point of the ethylenimine vapor, and
B. warming the reaction mixture from step (A) to a temperature sufficient to cause reaction between (1) and (2).

SUMMARY OF THE INVENTION

I have discovered that the effectiveness of the aminoethylated farinaceous materials described in U.S. Pat. No. 3,725,387 as paper additives is enhanced by acidification.

My invention is therefore a novel class of cationic farinaceous materials produced by:

A. contacting
   1. ethylenimine in the vapor phase at a temperature of at least about 40°C., with
   2. a granular farinaceous material(s), the temperature of which is below the dew point of the ethylenimine vapor,
B. warming the reaction mixture from step (A) to a temperature sufficieint to cause reaction between (1) and (2), and
C. acidifying the reaction mixture from step (B) with a protic acid.

By the terms "acidification" and "acidifying", I mean that sufficient acid is added to the aminoethylated product to lower the pH of an aqueous slurry of the aminoethylated product to a pH below 7, said slurry being an 8 weight percent slurry, total weight basis, of aminoethylated product in water.

The subject process is broadly applicable to granular farinaceous materials. By "granular" is meant that the farinaceous material is in a solid, particulate form and may vary in particle size from granules to an impalpable powder. By "farinaceous materials" is meant the known class of meals, flours and starches derived from cereal grains and cereal grasses (such as corn, wheat, rice, rye, barley, oats, sorghum, etc.) and starch derived from tuber plants (such as potatoes and other yams, arrowroot, etc.) and starch fractions (such as amylose and amylopectin) and modified starches (such as thin-boiling starches). It is recognized that some farinaceous materials (e.g. flour) contain minor amounts of proteinaceous materials as well as dextrin, sugars and other polysaccharides, and the like; such materials react with EI to form an aminoethylated product and thus are suitable in the subject process and are included under the term farinaceous materials. The preferred materials for use herein, however, are generally starch(es) with the starches derived from cereal grains being most preferred based on commercial availability. The farinaceous materials may suitably bear from trace amounts up to equilibrium amounts of water.

Step (A)

Step (A) comprises charging a granular farinaceous material at a temperature below the dew point of the EI vapor to be used (20°C. to 30°C. being preferred) to a suitable vessel and then introducing EI (in the vapor phase) to the starch and/or flour, preferably with agitation. The EI is charged at a temperature of at least about 40°C. and preferably at a temperature above its atmospheric boiling point. An inert gas (such as nitrogen, argon, etc.) may be included with the EI vapors as a carrier or sweep gas at temperatures between 40°C. and the atmospheric boiling point of EI. The amount of EI used can be varied depending upon the number of amino groups desired in the end product. Suitable amounts of EI in most instances, however, vary from about 0.5 percent to about 20 percent by weight, based on the dry weight of the farinaceous material. Preferred amounts of EI vary from about 1 percent to about 10 percent by weight.

Step (B)

Step (B) comprises heating the mixture from Step (A) to a temperature sufficient to cause EI to react with the farinaceous material. A convenient rate of reaction is generally obtained at temperatures of from about 80° to about 120°C. and preferred reaction rates are obtained at temperatures of from about 90° to about 100°C. At these temperatures, reaction times of from about 0.5 to about 4 hours are typical, and, in many instances, the reaction is substantially complete in 1 hour. Atmospheric, autogenous and superatmospheric pressures are commonly used but autogenous or superatmospheric pressures (e.g. 10–50 psig) are preferred.

Step (C)

Step (C) comprises acidifying the product from step (B) with a protic acid. Normally, the pH of an 8% aqueous slurry of the acidified product is from about 2.5 to about 7 (preferably, from about 3 to about 5). Essentially any protic acid can be used in step (C) but, obviously, liquid or gaseous acids are the most practical and are thus preferred. E.g., suitable such acids include HCl, HBr, $H_2SO_4$, $H_3PO_4$, $HNO_3$, acetic acid, acetic anhydride, etc. The most preferred acid is gaseous HCl, which is essentially anhydrous. Any convenient temperature (including ambient) may be used during step (C) but it is advantageous to maintain the reaction mixture in the range of from about 0° to about 100°C., and preferably from about 20° to about 60°C. The reaction mixture is generally stirred (or otherwise agitated) during the acidification step.

Steps (A)–(C) are each normally conducted in a vessel having means to agitate the farinaceous material, preferably at a rate sufficient to maintain the particles in a state of turbulized suspension. Examples of suitable such vessels include those defined by U.S. Pat. No. 3,527,606, the Strong-Scott Solidaire reactor (a commercially available apparatus sold by The Strong-Scott Mfg. Co., Minneapolis, Minnesota), and other like reactors. The Solidaire reactor is currently preferred since it adapts particularly well to a continuous process.

The reaction mixture from step (A) undergoes a temperature exotherm which can be easily monitored by conventional temperature recording means. The extent of the exotherm and the time necessary for the exotherm to reach a maximum will vary depending upon the farinaceous material used. However, the exotherm generally reaches a maximum in from about 1 to about 5 hours.

As an optional but preferred embodiment, the reaction mixture from step (A) is stored at least until the exotherm reaches a maximum prior to step (B) and may advantageously be stored for as long as 75–100 hours or more. Storage times of from 5 to 24 hours are preferred. Storage of the reaction mixture improves retention of the EI by the farinaceous material and facilitates handling since the presence of EI vapors above the reaction mixture after storage is substantially reduced (a practical minimum being obtained at about the same time that the exotherm peaks). It also generally increases the amount of non-extractable nitrogen in the final product (after step B). The reaction mixture from Step (A) is generally stored at ambient conditions in a closed vessel (e.g. a drum) but may be stored in a silo, a bin or a conveyor tube leading to the reaction vessel for step (B) or other convenient vessel.

SPECIFIC EMBODIMENTS

The following examples further illustrate the invention.

Equipment

A Strong-Scott Solidaire reactor, model SJ 84, was used in each example. It is a jacketed, horizontal tube with an agitator shaft that runs the entire length of the tube. The shaft has pins attached thereto that are canted and flattened on the end nearest the tube wall to provide mixing. The shaft speed was 1,150 r.p.m. and was sufficient to provide "zero gravity" to the starch or flour particles moving through the reactor tube (producing what has been described in U.S. Pat. No. 3,527,606 as a state of turbulized suspension). The reactor is equipped with an auger for continuously charging starch or flour at a uniform rate to the reactor and a screw conveyor for continuously removing the reaction product.

The batch reactor is a sealed kettle having a heater, a stirrer and gas ports.

EI was charged to the reactors from a weigh cell, through a rotameter and through a steam-jacketed tube and thus entered the reactor as a hot gas. EI feed rates were controlled by rotameter settings and confirmed by weight readings from the weigh cells.

Analytical Procedures

The nitrogen content was determined by the conventional Kjeldahl technique.

The moisture content of the flour or starch was determined with an O'Haus Moisture Balance with the lamp set at 1.5 inches above the sample; 40 watts on the heater; and the timer set for 15 minutes.

Viscosity measurements were made on a 500 g. sample of an aqueous paste or slurry of the flour or starch using a Brabender Visco/Amylo/Graph viscometer. The results are reported in Brabender units (B. U.). Flour viscosities were measured on pastes having an 11.1% solids content. Starch viscosities were measured on pastes having 8.0% solids content.

EXAMPLES 1–2

Pearl corn starch (1,000 lbs., 13.2% moisture content) was charged at ambient temperature to the batch reactor. The system was purged with nitrogen and EI (38.01 lbs.) added as undiluted vapors (90°–100°C.) to the rapidly stirred starch over a period of 7.5 hours. The stirred mixture was warmed to 90°C. over a 3-hour period, maintained at 90°–95°C. for 1 hour and cooled. EI was retained essentially quantitatively by the starch either as chemically bound aminoethyl groups (2.61% nitrogen, based on dry weight of starch) or as extractable polyethylenimine (1.54% nitrogen, same basis). The aminoethylated product thus prepared will be called Product A.

EX. 1: A first portion of Product A (at 80°C.) was blended in a Strong-Scott Solidaire reactor with gaseous HCl to give product 1. An aqueous slurry (8% by weight, total weight basis) of product 1 had a pH of 3.3 and a peak viscosity of 560 B. U. at 82°C.

Ex. 2: A second portion of Product A (at 25°–30°C.) was likewise blended with gaseous HCl to give product 2. An 8% aqueous slurry of product 2 had a pH of 6.1 and a viscosity of 960 B. U. at 81°C.

EXAMPLE 3

Pearl corn starch (13.4% moisture content) was continuously charged to the Strong-Scott Solidaire reactor at a rate of about 150 lbs./hour and at a temperature of from 15° to 20°C. EI was simultaneously charged to the reactor as undiluted vapors (90°–100°C.) at a rate of about 4.35 lbs./hr. The product was stored in a sealed container for approximately 40 hours and a 100 lb. aliquot subsequently heated to 90°C. over a 25-minute period, held at 86° to 95°C. for 1 hour and cooled to 40°C. over a 1-hour period. Anhydrous HCl was charged to this rapidly stirred material to give product 3. An 8% aqueous slurry of product 3 had a pH of 6.8 and a peak viscosity of 830 B. U. at 81°C.

EXAMPLE 4

Wheat flour (970 lbs., 14% moisture content) was charged to the jacketed batch reactor. EI (29 lbs.) was added to the pre-cooled stirred flour (15°–25°C.) as undiluted vapors (90°–100°C.) over a 5.33-hour period.

The material was stored in the reaction vessel overnight and then heated to 90°C. over a 2-hour period, held at 90°–96°C. for 1 hour and cooled to 35°C. over a 2.5-hour period. The product thus prepared and gaseous HCl were simultaneously charged at ambient temperature to a Strong-Scott Solidaire reactor to give product 4. An 8% aqueous slurry of product 4 had a pH of 5.3.

EXAMPLES 5–9

An aminoethylated pearl corn starch (4.38% nitrogen) was prepared according to the method of Example 3. Various amounts of aqueous HCl (conc.) were added to aliquots of an 8% aqueous slurry thereof to give products 5–9 having a range of pH values as noted in Table I. In each instance, the acid was added dropwise to the stirred slurry and the pH monitored with a pH meter.

Utility of Examples 1–9 in Paper

The acidified aminoethylated farinaceous products herein described are useful in the paper industry, e.g. as pigment retention aids and strength additives. They are incorporated into the paper via conventional techniques. Generally, they are added to the paper pulp as pre-cooked slurries, as are most cationic starches. To illustrate the utility of the subject materials, the products of Examples 1–4 were evaluated by conventional techniques in a standard bleached 75%/25% hardwood/softwood Kraft pulp (beat to a Canadian Standard Freeness of 342 ml. — TAPPI 227M58). Titanium dioxide (4 weight percent, based on dry pulp weight) and clay (8 weight percent) were added to the stirred pulp as fillers and sufficient alum added to adjust the pH to 4.5. The dilution water contained 150 ppm hardness expressed as $CaCO_3$. The acidified aminoethylated products were diluted with water and heated for 20 minutes at 90°–95°C. Various amounts of these cooked products were blended into aliquots of the pulp slurry and handsheets prepared therefrom pursuant to TAPPI 205M58. The handsheets were air-dried, cured by heating for 1 hour at 105°C. and conditioned overnight in a room of constant humidity, and ashed. From the ashed samples the percent of filler retained in each handsheet was determined. The results are reported in Table I.

In another series of tests, the products of Examples 5–9 were similarly evaluated as pigment retention aids. The results are likewise summarized in Table I.

A control sample was determined on each series by ashing a handsheet prepared from the identical pulp/$TiO_2$/clay/alum mixture without any acidified aminoethylated product added. The control for Examples 1–4 was 13.6%. The control for Examples 5–9 measured about 21.4%.

The burst factor test (TAPPI T403 (December 1965)) run on the handsheets containing the product of Example 1 showed that said product was an effective strength additive in paper. The remainder of the subject compounds are likewise useful as strength additives.

Other acidified aminoethylated farinaceous materials prepared in accordance with the novel process herein described are similarly useful.

I claim:

1. A process for producing cationic farinaceous materials comprising the steps:
   A. contacting
      1. ethylenimine in the vapor phase at a temperature of at least about 40°C., with
      2. at least one granular farinaceous material at a temperature below the dew point of the ethylenimine vapor;
   B. warming the reaction mixture from (A) to a temperature sufficient to cause reaction between (1) and (2); and
   C. acidifying the reaction product of step (B) with a Brönsted acid; the pH of an 8 weight percent aqueous slurry of the product from step (C) being from about pH 2.5 to 7.0.

2. The process defined by claim 1 wherein said pH is from about pH 3.0 to about pH 5.0.

3. The process defined by claim 1 wherein gaseous HCl is used to acidify the reaction product of step (B).

4. The process defined by claim 3 wherein step (C) is conducted at a temperature of from about 0° to about 100°C.

5. The process defined by claim 4 wherein step (C) is conducted at a temperature of from about 20° to about 60°C.

6. The process defined by claim 1 wherein said farinaceouos material is starch.

7. The process defined by claim 1 wherein said farinaceous material is flour or starch; wherein said ethylenimine is at a temperature equal to or greater than its atmospheric boiling point and is added in an amount of from about 0.5 to 20 weight percent, based on the dry weight of the flour or starch; wherein step (B) is conducted at a temperature of from about 80° to about 120°C; wherein step (C) is conducted at a temperature of from about 0° to about 100°C with gaseous HCl.

8. The process defined by claim 7 wherein said farinaceous material is starch and wherein the pH of an 8 weight percent slurry of the acidified product is from about 3.0 to about 5.0.

Table I

| Product of Example | pH | Percent Filler Retained Loading of Acidified Aminoethylated Product Per Ton of Dry Pulp | | | |
|---|---|---|---|---|---|
| | | 5 lbs. | 10 lbs. | 15 lbs. | 20 lbs. |
| 1 | 3.3 | 25.8 | 33.6 | 38.2 | NM* |
| 2 | 6.1 | 22.4 | 27.4 | 32.6 | NM* |
| 3 | 6.8 | 19.3 | 23.4 | 26.7 | NM* |
| 4 | 5.3 | 20.1 | 23.9 | 26.0 | NM* |
| 5 | 2.5 | 40.0 | 46.3 | 50.2 | 49.1 |
| 6 | 3.5 | 39.9 | 48.5 | 56.3 | 55.1 |
| 7 | 4.5 | 42.1 | 48.5 | 56.0 | 51.2 |
| 8 | 5.5 | 31.3 | 39.1 | 44.1 | 48.9 |
| 9 | 6.5 | 40.5 | E* | 46.5 | 52.0 |
| Pearl | Corn Starch | 22.1 | 20.3 | 19.9 | 20.4 |

*"NM" means not measured and "E" means an error in testing which invalidated the data point.

9. The process defined by claim 1 comprising the additional step between steps (A) and (B) of maintaining the reaction mixture from step (A) at ambient conditions in a closed vessel for a time at least sufficient for the exothermic temperature rise of the mixture to attain essentially the maximum value.

* * * * *